Sept. 17, 1963  R. R. MANDY  3,103,684
WINDSHIELD CLEANER CONTROL
Filed April 17, 1961
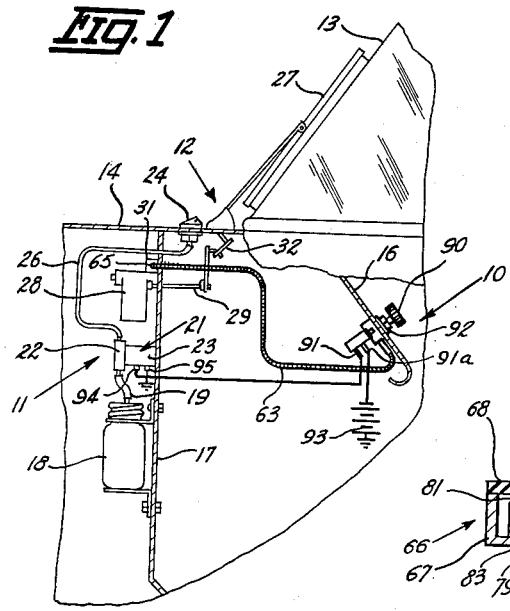
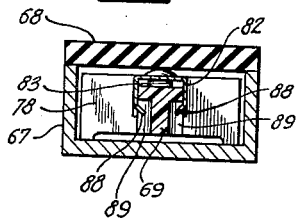
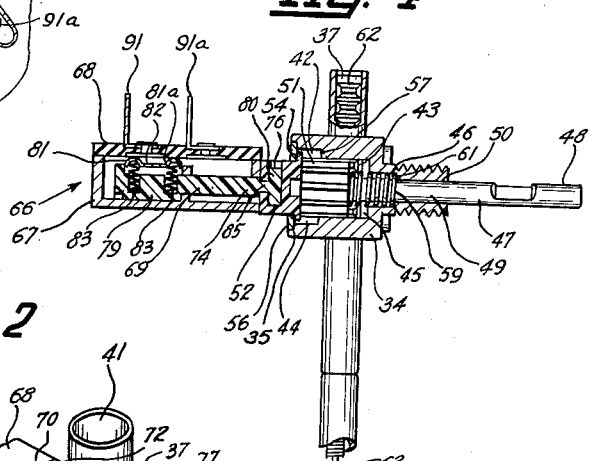
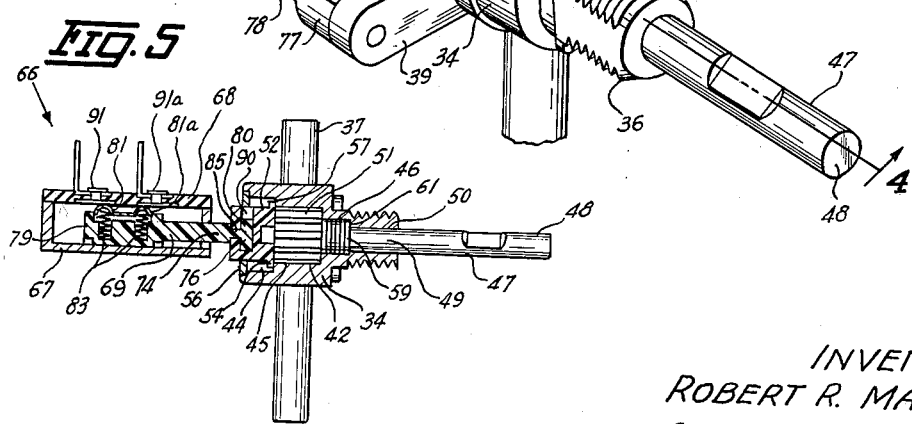
INVENTOR.
ROBERT R. MANDY
BY Lowell & Henderson
ATTORNEYS.

United States Patent Office 3,103,684
Patented Sept. 17, 1963

3,103,684
WINDSHIELD CLEANER CONTROL
Robert R. Mandy, Detroit, Mich., assignor to The Delman Company, Cookeville, Tenn., a corporation of Tennessee
Filed Apr. 17, 1961, Ser. No. 103,418
1 Claim. (Cl. 15—250.02)

This invention relates generally to a windshield clearing system and in particular to an improved control means for selectively or concurrently controlling the operation of the wiper unit and washer unit of such system.

An object of this invention is to provide a common control means for operating the windshield washer and wiper units in a windshield clearing system.

A further object of this invention is to provide a control means, common to the washer and wiper units of a windshield clearing system, adapted to selectively provide a sole operation of the wiper or washer units or a coordinated operation of both units.

Still another object of this invention is to provide a common control means for the wiper unit and washer unit of a windshield clearing system, which is of a simple and compact construction, economical in cost and installation and adapted to control the operation of fluid pressure and electrical motor means operatively associated with said wiper and washer units.

Further objects, features and advantages of this invention will become apparent from the following description when taken in connection with the accompanying drawing in which:

FIG. 1 is a fragmentary longitudinal foreshortened sectional view of a vehicle showing a windshield clearing system embodying the control means of this invention;

FIG. 2 is an enlarged perspective view of the control means of this invention with parts broken away to more clearly show its construction;

FIG. 3 is a detailed sectional view as seen along the line 3—3 in FIG. 2;

FIG. 4 is a longitudinal sectional view of the control means taken along the line 4—4 in FIG. 2 and shown of a reduced size relative to its showing in FIG. 2; and FIG. 5 is a view illustrated similarly to FIG. 4 showing parts in changed positions relative to their showing in FIG. 4.

With reference to the drawings, the control device of this invention, indicated generally as 10, is shown in FIG. 1 in assembly relation with a vehicle windshield washer unit and a vehicle windshield wiper unit designated generally as 11 and 12, respectively.

The vehicle is illustrated as having a windshield 13, an engine cowl 14 extended forwardly of the windshield and an instrument panel or dashboard 16 located rearwardly thereof. The vehicle is further equipped with a usual fire wall 17.

The washer unit 11 includes a fluid container or reservoir 18 connected through a fluid line 19 with a pump assembly 21, mounted on the fire wall 17, that comprises a pump unit 22 operatively associated in a driven relation with an electric motor 23. A nozzle 24 attached to the cowl 14 at a position forwardly of the windshield 13 is connected with the pump 22 through a fluid line 26. On operation of the motor 23 to operate the pump 22, fluid under pressure is supplied to the nozzle 24 into the path of movement of a wiper 27 that forms part of the windshield wiping unit 12.

The wiper unit 12 includes a well known commercial type vacuum motor 28 having a drive shaft 29 and provided with a reciprocal slide or control valve 31 for rendering the motor 28 operative and inoperative. The drive shaft 29 is connected with the wiper 27 through a transmission mechanism indicated generally at 32.

The control device 10 of this invention (FIG. 2) is comprised of a tubular casing 33 of a generally cylindrical shape having a main section 34 and reduced end section 36, which for convenience will hereinafter be referred to as the outer end section of the casing 33. Integrally formed with the main section 34 is a transversely extended tubular guide or bearing member 37 which is offset from the longitudinal axis of the casing 33. Also formed integral with the main section 34 are a pair of opposite laterally extended arms 38 and 39 arranged normal to the tubular guide 37.

The bore 41 of the guide or sleeve 37, at its junction with the main casing section 34, is open to the bore 42 of the casing 33 as indicated at 43 in FIG. 4. The casing bore 42 is of a stepped formation having bore sections 44, 45, 46 and 50 of progressively smaller diameter in a direction inwardly from the casing end 36, with the bore 41 of the sleeve 37 being open to the bore section 45.

The casing 33 constitutes a bearing for supporting a shaft or manipulating element 47 for relative axial and rotative movement. The shaft 47, from what will be termed its outer end 48, is progressively formed with a bearing section 49, a gear section 51 and a coupling section 52; the bearing section 49 and gear section 51 being positioned within the bore sections 50 and 45, respectively. In other words, the shaft 47 is journaled within the bore sections 50 and 45.

At the junction of the gear section 51 and coupling section 52 there is provided an outwardly extended stop collar or flange 54 which is in contact engagement with the inner peripheral wall of the bore section 42. A retaining and stop washer 56 is mounted about the coupling section 52 and held in a seated relation within the inner end 35 of the casing 33. This retaining washer 56 functions as a bearing support for the coupling section 52 and cooperates with the shoulder 57, at the junction of the bores 42 and 45, to limit the axial movement of the shaft 47 between positions defined by the engagement of the stop collar 54 with either the retaining ring 56 or the junction shoulder 57. A coil spring 59 mounted about the shaft section 49 is receivable within the bore section 46 and arranged in compression between the gear section 51 and a shoulder 61 formed at the junction of the bores 45 and 50 so as to normally bias the shaft 47 in a direction toward the inner end 35 of the casing 33.

The shaft section 49 is formed of metal, and the gear section 51 and coupling section 52 of a plastic material. In the assembly of the shaft 47, the sections 51 and 52 are mounted, as a unit, about the inner end of the shaft section 49.

Positioned within the bore 41 of the tubular guide 37 is a gear rack member 62, which at the junction opening 43 between the casing center section 34 and guide 37 is in meshed engagement with the gear 51 on the shaft 47. One end of the rack 62 is connected to one end of a Bowden wire 63, the other end 65 of which is connected to the control valve 31 of the wiper motor 28, as illustrated in FIG. 1. On rotation of the shaft 47, therefore, the rack 62 is reciprocally moved within the tubular guide 37 to in turn actuate the Bowden wire 63 to operate the wiper motor valve 31 to positions rendering the wiper motor 28 operative and inoperative. This control function takes place for all axially moved positions of the shaft 47 relative to the casing 33, the dimension of the gear 51 axially of the shaft 47 being of a length to maintain a continuous meshed engagement between the gear 51 and the rack 62. It will be apparent that the spring 59 normally maintains the collar 54 against the retaining washer 56, and that axial movement of the shaft 47 toward the outer end 36 of the casing 33 is against the action of the spring 59.

This axial movement of the shaft 47 controls the operation of an electrical switch unit 66 (FIGS. 2 and 4) which comprises a casing 67 of a box shape provided with a cover 68. The cover 68 (FIG. 2) has a cutout 70 at each of its corners 71 for receiving bendable clips 72 integrally formed with the casing 67 and bendable to hold the cover 68 in assembly relation with the casing 67.

A switch actuator 69 (FIGS. 2, 4 and 5) reciprocally movable longitudinally of the casing 67 and formed of a plastic or like material has a coupling end portion 74 extended outwardly from the casing 67 and adapted to be connected in a cooperating detachable relation with the coupling section 52 of the shaft 47. The end portion 74 is formed with a coupling key 76 having an annular head 80 and neck 85, for reception within a slotted keyway 90 formed in the coupling section 52. The coupling connection is such that the actuator 69 is linearly movable with the shaft 47 but is in a slip-connection with the coupling 52 so as to permit relative rotational movement of the shaft 47.

The casing 67 is integrally formed at its outer end with a pair of transversely opposite lugs 77 adapted to be secured as by screws 78 with the arms 39 of the casing 33. When the switch unit 66 is thus connected to and supported from the casing 33 the switch actuator 69 and the shaft 47 are in linear alignment.

The actuator 69 (FIGS. 2 and 3) includes a pair of longitudinally spaced transversely extended guide plates 78 having therebetween a contact block 79 provided with a pair of spaced spring pressed contacts 81 and 81a. These contacts 81 and 81a form part of a contact plate 82 biased away from the block 79 by springs 83, the plate 82 being retained in assembly relation with the block 79 by the provision of inwardly extended oppositely arranged bent fingers 88 which are ridable within corresponding grooves 89 formed in the block 79.

The contacts 81 and 81a cooperate with terminals 91 and 91a in the cover 68 for opening and closing the circuit of the pump electric motor 23. As shown in FIG. 4, when the shaft 47 is in its innermost position the contact 81a is out of engagement with the terminal 91a so as to open the motor circuit 21. When the shaft 47 is pulled in a direction away from the outer end 36 of the casing 33, from its position in FIG. 4 to its position in FIG. 5, the contacts 81 and 81a are engaged with corresponding terminals 91 and 91a so as to close the circuit of the electric motor 23. On release of the shaft 47 the motor circuit is automatically broken by the action of the spring 59.

In installation (FIGS. 1 and 2) the control device 10 is positioned beneath the dash panel 16, with the casing section 36, which is externally threaded, inserted through an opening (not shown) in the panel. A lock nut 92 is then tightened about the section 36 to clamp the device 10 on the panel. The Bowden wire 63 is then connected in a well known manner with the control valve 31 of the wiper motor; the terminal 91a is connected to the hot side of a battery 93 and the terminal 91 to a first terminal 94 on the pump motor 23. A second terminal 95 on the motor 23 is connected to ground.

In use, therefore, when only operation of the wiper unit 12 is desired, the shaft 47 is merely rotated relative to the casing 33 whereby the Bowden wire 63 is actuated to operate the wiper motor control valve 31. Should operation of only the washer unit 11 be desired, the shaft 47 is merely moved from its position in FIG. 4 to its position in FIG. 5 to in turn move the contacts 81 and 81a into contact engagement with corresponding ones of the terminals 91 and 91a. On release of the shaft 47 operation of the washer unit 12 is automatically discontinued by the biasing action of the spring 59. When joint or coordinated cooperation of the washer unit 11 and wiper unit 12 is desired, the shaft 47 is both rotated and axially moved whereby these units are concurrently operated in the manner above described. Manipulation of the shaft 47 is facilitated by a hand knob 90 (FIG. 1) mounted on the outer end of the shaft.

Although the invention has been described and illustrated with respect to a preferred embodiment thereof it is to be understood that it is not to be so limited since modifications and changes can be made therein which are within the full intended scope of this invention as defined in the appended claim.

I claim:

In a windshield clearing system having wiper means operated by a wiper motor which has a control for regulating the operation of the said motor and a fluid spraying means operated by an electric motor,
 (a) common control means for independently or jointly energizing said wiper motor and electric motor comprising,
 (b) a casing,
 (c) a manipulating element movably supported on said casing, said element being rotatable about and linearly movable with respect to the longitudinal axis thereof,
 (d) a gear secured to said element, said gear having an axis of rotation substantially coincident to the axis of rotation of said element,
 (e) a gear rack supported on said casing transversely of said element and in meshing engagement with said gear, said gear rack in response to rotation of said gear having reciprocal linear movement and being stationary in response to linear movement of said gear along the longitudinal axis of said element,
 (f) a force transmitting member connected to said rack and wiper motor control whereby upon rotation of said element said control is actuated to render said wiper motor operative and inoperative, and
 (g) an electric switch means on said casing responsive to axial movement of said element and operatively coupled with said electric motor for rendering said fluid spraying means operative and inoperative.

References Cited in the file of this patent
UNITED STATES PATENTS

| | | |
|---|---|---|
| 2,834,978 | Harrison | May 20, 1958 |
| 2,877,486 | Deibel et al. | Mar. 17, 1959 |